United States Patent Office 3,510,526
Patented May 5, 1970

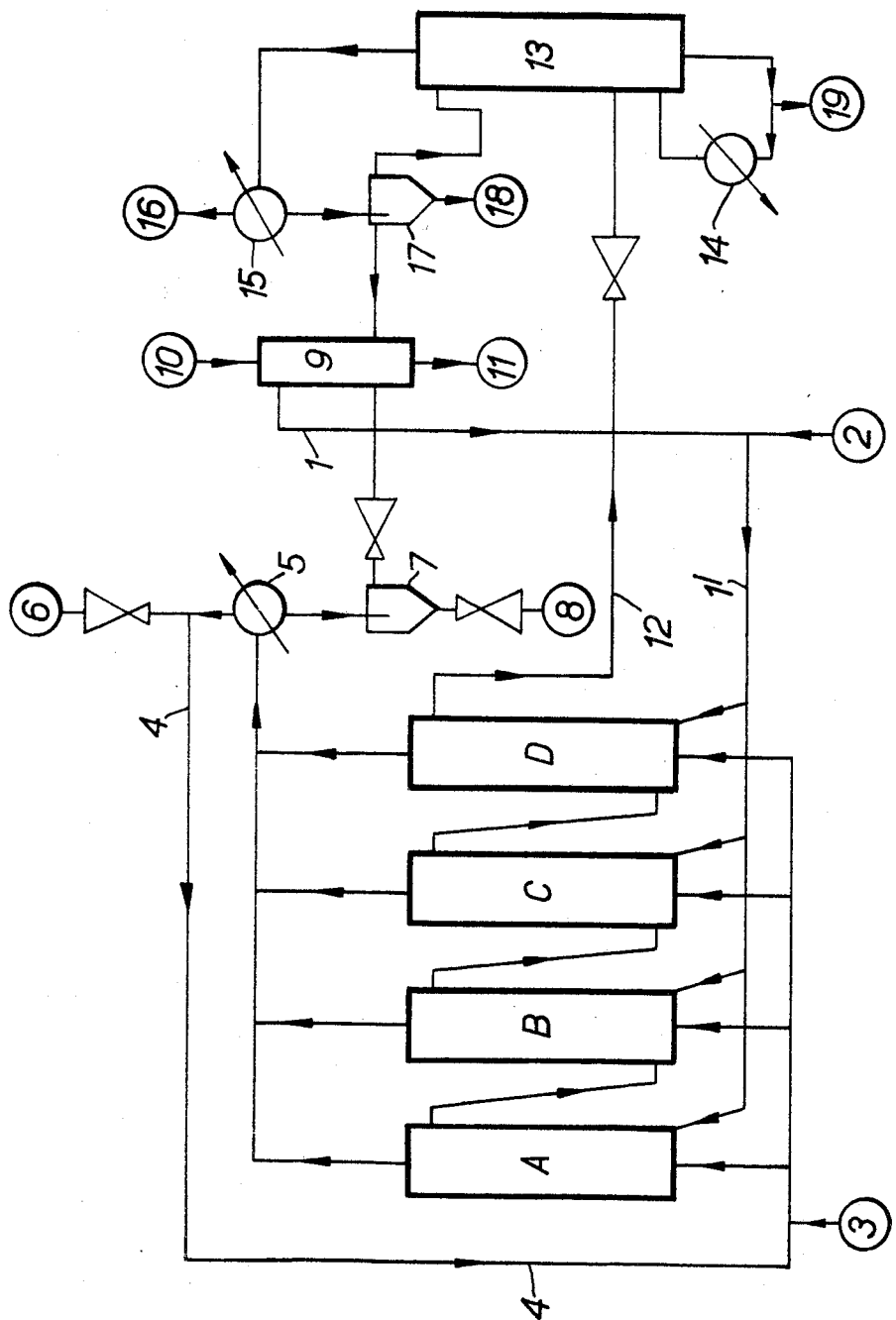

3,510,526
PROCESS FOR THE PREPARATION OF
HYDROPEROXIDES
Jacques Paul Marie Bonnart, Lyon, Yannik Bonnet,
Ecully, Rhone, and Paul Pierre Marie Rey, Lyon,
France, assignors to Rhone-Poulenc S.A., Paris, France,
a French body corporate
Filed June 22, 1967, Ser. No. 648,046
Claims priority, application France, June 30, 1966,
67,736
Int. Cl. C07c 73/00, 73/06
U.S. Cl. 260—610
5 Claims

ABSTRACT OF THE DISCLOSURE

Improved results are obtained if, in the oxidation of cycloalkanes to cycloalkane hydroperoxides with oxygen, the unoxidised cycloalkane is contacted with a basic reagent after separation of the hydroperoxide and prior to recycling.

---

The present invention relates to the preparation of hydroperoxides.

It is known that cycloalkyl hydroperoxides may be manufactured by reaction of molecular oxygen, more or less diluted with an inert gas, with liquid cycloalkanes raised to an appropriate temperature. It is also known that the production of hydroperoxides is accompanied by the formation of other products, including alcohols, ketones, acids and esters, in an amount which depends on the cycloalkane employed and on the conditions under which the oxidation is carried out.

The importance of hydroperoxides as oxidising agents or as intermediates in the preparation of basic industrial products such as aldehydes, ketones or alcohols is known. Thus it is known to convert mixtures arising from the oxidation of cycloalkanes with oxygen into solutions of cycloalkanols, and possibly cycloalkanones, by reduction or by heating in the presence of catalysts or of an alkali metal hydroxide. The hydroperoxides may also be used for the preparation of organoperoxyboranes.

To produce the hydroperoxide alone it is clearly appropriate to work under conditions which yield this product with the least possible amount of by-products. Furthermore it is desirable to achieve this result under optimum economic conditions, which in particular implies re-using the unconverted cycloalkane under the best possible conditions.

In order to inhibit the deleterious effect of the acids which form during the oxidation, it has been proposed (see United States patent specification No. 2,430,864) to carry out the oxidation of the cycloalkanes with a gas containing molecular oxygen whilst working in the presence of alkaline reagents which are capable of forming salts with the acid compounds formed during the oxidation. After this, a dilute solution of hydroperoxide is isolated by decantation and this may be concentrated by simple distillation, whilst the recovered cycloalkane may be recycled. This process produces hydroperoxides in relatively low yields and with low selectivity of the oxidation.

It has been proposed (United States patent specification No. 2,931,834) to prepare solutions of cyclohexyl hydroperoxide by oxidising cyclohexane with a gas containing molecular oxygen without using a stabiliser, the formation of by-products being limited by using as short a dwell time as possible of the reagents in the oxidising equipment, by working at as low a temperature as possible, and by low degrees of conversion. The unoxidised cyclohexane may be recovered by distillation at the same time as a concentrated solution of hydroperoxide is produced, the water and volatile acids formed during the oxidation, which distil with the cylohexane, being separated from the distillate by simple decantation.

It has been proposed to increase the yield of hydroperoxides derived from alkylcyclopentanes by carrying out the oxidation of the corresponding hydrocarbons in the presence of an aqueous solution of an alkali metal pyrophosphate or of calcium pyrophosphate (United States Patent specification No. 2,798,096.

It is also known that the production of hydroperoxides may be opposed by the presence of metals favouring the decomposition of the hydroperoxides, and it has been proposed to remedy this by carrying out the oxidation of the cycloalkanes in the presence of sequestering agents for metals, such as ethylene diemine tetraacetic acid (see French patent specification No. 1,404,723).

The various measures examined hitherto undoubtedly limit side reactions. It is however desirable to limit the formation of by-products even more than has heretofore been possible and to avoid adding additional compounds to the oxidising zone. The use of such additional compounds can cause various disadvantages, either because of their own volume (in the case of alkaline solutions) which reduces the volume yield of the equipment, or because of encrustations. It will further be appreciated that in processes which do not involve the use of auxiliary stabilisers it is difficult to achieve satisfactory re-use of the hydrocarbon recovered by simple distillation followed by decantation from the distillate.

The present invention provides an improved process for the continuous preparation of cycloalkyl hydroperoxides by oxidation of the corresponding cycloalkanes with a gas containing molecular oxygen, in which at least a part of the unoxidised cycloalkane is recycled and no stabiliser is introduced into the oxidising equipment. This process comprises contacting a cycloalkane in the liquid phase at elevated temperature with oxygen, separating the hydroperoxide formed, and recycling at least part of the unoxidised cycloalkane to the oxidation zone after treatment with a basic reagent. Cycloalkanes which have been treated in this way permit oxidation runs with higher conversion yields than those previously proposed for similar processes with recycling of untreated cycloalkane. The process of the invention may be applied to the manufacture of a great variety of cycloalkyl hydroperoxides, and in particular to the preparation of cyclohexyl hydroperoxide.

The oxidation of the hydrocarbon is preferably carried out without a catalyst and under pressure, in a stainless steel apparatus whose walls have previously been rendered passive, for example by a treatment with pyrophosphates. The reaction temperature and the degree of conversion can vary within quite wide limits, depending on the ease of oxidation of the hydrocarbon and the heat stability of the resulting hydroperoxide. The conditions heretofore used for the oxidation of cycloalkanes to cycloalkane hydroperoxides with oxygen are perfectly satisfactory. By way of example, when the hydrocarbon to be oxidised is cyclohexane, the process is generally carried out at a temperature of the order of 180° C. with a degree of conversion of about 4%. The gas introduced into the oxidation zone may be air, or preferably air in which the oxygen content has been reduced by the complementary introduction of an inert gas such as nitrogen or carbon dioxide, so as to produce a mixture whose oxygen content is about 12 to 15%.

The gas which is not consumed by the reaction and the liquid phase may together be introduced into a gas-liquid separator but, in order to limit the hot dwell time of the hydroperoxide in contact with the oxidation by-products, it is preferable to carry out the gas-liquid separation directly on issuing from the reaction zone. For example the unused gases may be separated at the top of the oxidation zone and passed into a condenser where the products carried away with them are condensed (unoxidised hydrocarbon, water and acid by-products); an aqueous acid phase is separated from the condensate whilst the hydrocarbon is treated with a basic reagent and then recycled to the oxidation stage.

The basic reagent used for treating the recycled hydrocarbon may be an inorganic compound derived from an alkali or alkaline earth metal. For example hydroxides, or salts of weak acids such as the carbonate or bicarbonate, may be used. These reagents may be used in solution or in suspension, but it is preferable to carry out the treatment with solutions and, more precisely, with dilute aqueous solutions of an alkali metal hydroxide such as sodium hydroxide and potassium hydroxide. The washing techniques normally used may then be employed. Thus, it is possible to work by trickling through a packed column, whilst recycling a part of the aqueous layer, or preferably by a counter-current process in a perforated plate column.

The amount of basic reagent may vary within quite wide limits depending on its nature and on the manner in which it is employed. Generally, the amount of the basic medium used, whether dealing with a solid reagent, a suspension or a solution, must be sufficient to ensure that the hydrocarbon recycled is neutral. In practice, when using aqueous solutions whose concentration is less than 10%, e.g. 1 to 10%, it is not necessary to use amounts of aqueous solutions greater than 25% by weight of the hydrocarbon which is to be recycled, and amounts of, e.g. 0.2 to 25%, can be used.

According to a variant of the process the hydrocarbon to be recycled may be washed with water before treating it with the basic reagent which may also consist of, apart from the compounds quoted above, an ion exchange resin with basic sites.

The alkaline treatment may be carried out at ambient temperature (25° C.) or preferably at between 30° and 60° C. After decantation, the separated hydrocarbon may be dried before being recycled to the oxidation stage.

The liquid phase in the oxidation zone may be removed continuously, for example by an overflow. This liquid phase still contains dissolved gases and a part of the water and of the volatile acids formed during the oxidation. These products may be removed in a simple manner by releasing the pressure on the hot liquid phase. In this way they are volatilised together with a part of the hydrocarbon, whilst the hydroperoxide remains in the residual liquid phase. After cooling the products which have been volatilised by pressure release, the uncondensed gases and the aqueous layer are separated therefrom and the hydrocarbon is then recycled after it has been treated with a basic reagent in the manner indicated above.

The liquid phase which remains after pressure release and which consists of a solution of hydroperoxide in unoxidised hydrocarbon may be used as such for numerous uses. For other uses it is possible to remove part or all of the unoxidised hydrocarbon and to recycle it to the oxidation zone after treatment with a basic reagent in the manner indicated above. In practice, this concentration may advantageously be carried out by releasing the pressure on the hot liquid phase coming from the oxidising equipment in a distillation zone in which the temperature at the bottom and the degree of reflux is regulated as a function of the desired hydroperoxide concentration. This treatment may be carried out separately, but in practice it is generally advantageous to pass the hydrocarbon to be recycled, arising from various points of the installation, to the same zone of treatment with the basic reagent.

The following example shows how the process of the invention may be implemented.

Example

The apparatus used is shown schematically in the accompanying drawing. It comprises four cylindrical oxidising vessels (height: 280 cm.; diameter: 6.6 cm.) A, B, C and D of stainless steel, whose internal walls have been rendered passive with sodium pyrophosphate. Each of them has a useful capacity of 7 litres and has an external jacket containing a fluid kept at 190° C. The vessels are arranged in a cascade.

Cyclohexane consisting partly of recovered cyclohexane coming from the pipeline 1 and partly of fresh cyclohexane coming from the reservoir 2 is introduced into the bottom of each oxidising vessel, the mixture being preheated to 175° C. Air in which the oxygen content has been reduced to 13–14% by adding a part of the used gases recycled through the pipeline 4 is also introduced from a point 3 into the bottom of each oxidising vessel. The temperature in each of the oxidising vessels is kept close to 180° C. by controlling the flow rate of cyclohexane and the flow rate of air into the bottom of each of the oxidising vessels. The pressure is maintained at 18 bars relative pressure.

The used gases (containing about 3% of oxygen) issuing from the upper part of each of the oxidising vessels are passed to the condenser 5 which condenses the condensable products (cyclohexane, water and formic acid) which have been carried over by the gas. Part of the uncondensed gases (nitrogen, carbon dioxide and unused oxygen) is recycled through the pipeline 4 and the rest is removed at 6 after releasing the pressure. The condensed products are passed to the decanter 7; the aqueous layer is removed at 8 after releasing the pressure, whilst the cyclohexane is, after releasing the pressure, passed to the base of the column 9 which is supplied in counter-current at point 10 with an aqueous caustic soda solution containing 2% NaOH, at a flow rate which represents 1.5% by weight of the cyclohexane.

The column 9 is a cylindrical column (height: 100 cm.; diameter: 10 cm.) packed with porcelain fragments. The purified cyclohexane is recycled to the oxidising vessels through the pipeline 1 whilst the aqueous wash phase is removed at 11.

The liquid oxidation phase which overflows from the oxidising vessel D has its pressure released to atmospheric pressure, whilst hot, in a plate column 13 whose interior surfaces have been rendered passive by means of sodium pyrophosphate, and which is fitted at its bottom with a boiler 14 which through a branch circuit keeps the liquid mixture at the bottom of the column at a temperature of 86° C. The volatilised fraction (cyclohexane, water, lower acids such as formic acid, and gas) is passed into the condenser 15; the condensable products (cyclohexane, water and formic acid) are passed to the decanter 17 whilst the non-condensable gases are removed at 16. A part of the decanted cyclohexane in 17 is directed to the wash column 9 and then recycled to the oxidising vessels; the other part refluxes in the distillation column 13 whilst the decanted aqueous layer is removed at 18. The preconcentrated cyclohexane oxidation solution so obtained is withdrawn at 19 at the base of the distillation column, at the rate of 14 kg./hour.

The table below gives the properties of two cyclohexyl hydroperoxide solutions obtained for two different sets of running conditions, giving the degrees of conversion on issuing from the oxidising vessel D and the final concentrations of oxidation products.

|  | Percent | |
| --- | --- | --- |
| Degree of conversion on issuing from D | 4.17 | 4.23 |
| Oxidation products in the solution | 17.65 | 16.55 |
| Peroxides in the solution | 12.12 | 11.6 |
| Peroxides in the oxidised products | 68.7 | 70 |

If the cyclohexane is directly recycled without subjecting it to the alkaline treatment, the proportion of peroxides in the oxidised product falls 11%.

We claim:

1. Process for the preparation of cyclohexyl hydroperoxide which comprises contacting cyclohexane in a multiple stage oxidation reactor in the liquid phase at elevated temperature with oxygen, separating the hydroperoxide formed from the unoxidised cyclohexane, contacting at a temperature of 25° to 60° C. at least part of the unoxidised cyclohexane with an aqueous solution of a basic reagent selected from the class consisting of alkali metal hydroxides, carbonates and bicarbonates and alkaline earth metal hydroxides, and recycling the thus treated unoxidised cyclohexane to the oxidation zone.

2. Process according to claim 1 in which the cycloalkane is oxidized with a mixture of oxygen and inert gas containing 12 to 15% of oxygen.

3. Process according to claim 1 in which the basic reagent is sodium hydroxide or potassium hydroxide.

4. Process according to claim 1 in which the treatment with the basic reagent is effected at 30° to 60° C.

5. In a process for the preparation of cyclohexyl hydroperoxide by contacting cyclohexane in a multiple stage oxidation reactor in the liquid phase at elevated temperature with oxygen, separating the hydroperoxide formed from the unoxidised cyclohexane and recycling at least part of the unoxidised cyclohexane, the improvement which consists in contacting at 25° to 60° C. the separated unoxidised cyclohexane prior to recycling with an aqueous solution of a basic reagent selected from the class consisting of alkali metal hydroxides, carbonates and bicarbonates, and alkaline earth metal hydroxide.

References Cited

UNITED STATES PATENTS 2,621,213  12/1952  Joris _____ 260—610

FOREIGN PATENTS 700,546  12/1953  Great Britain.
964,869  7/1964  Great Britain.
958,067  5/1964  Great Britain.

BERNARD HELFIN, Primary Examiner

W. B. LONE, Assistant Examiner